United States Patent
Fujishige et al.

(10) Patent No.: US 11,034,114 B2
(45) Date of Patent: Jun. 15, 2021

(54) MANUFACTURING METHOD OF CAP AND MANUFACTURING APPARATUS OF CAP

(71) Applicant: Daiwa Can Company, Tokyo (JP)

(72) Inventors: Eiji Fujishige, Sagamihara (JP); Junji Matsumura, Sagamihara (JP); Eiji Araki, Sagamihara (JP); Kenji Takagi, Sagamihara (JP); Takashi Kawada, Sagamihara (JP)

(73) Assignee: Daiwa Can Company

( * ) Notice: Subject to any disclaimer, the term of this patent is extended or adjusted under 35 U.S.C. 154(b) by 72 days.

(21) Appl. No.: 16/270,668

(22) Filed: Feb. 8, 2019

(65) Prior Publication Data

US 2019/0248090 A1    Aug. 15, 2019

(30) Foreign Application Priority Data

Feb. 9, 2018 (JP) .............................. JP2018-022326

(51) Int. Cl.
*B29D 99/00* (2010.01)
*B65D 41/34* (2006.01)
*B65D 41/32* (2006.01)

(52) U.S. Cl.
CPC ....... *B29D 99/0096* (2013.01); *B65D 41/325* (2013.01); *B65D 41/3428* (2013.01)

(58) Field of Classification Search
CPC .............. B29D 99/0096; B65D 41/325; B65D 41/3428; B65D 41/34
See application file for complete search history.

(56) References Cited

U.S. PATENT DOCUMENTS

2020/0216227 A1*  7/2020  Araki ..................... B29C 43/18

FOREIGN PATENT DOCUMENTS

| JP | 2004-217295 A | 8/2004 |
| JP | 2017-178421 A | 10/2017 |

\* cited by examiner

*Primary Examiner* — John C Hong
(74) *Attorney, Agent, or Firm* — Harness, Dickey & Pierce, P.L.C.

(57) ABSTRACT

A manufacturing method of a cap (100) includes: supplying a first resin material to a molded product (111A) having a top plate portion (121) and a skirt portion (122) integrally formed on the top plate portion (121) through a corner portion (123); molding the first resin material of the molded product (111A) disposed in a first lower mold (21) into a sliding layer (141) with a first upper mold (22); supplying a second resin material to the sliding layer (141); molding the second resin material of the molded product (111A) disposed in a second lower mold (31) into a sealing layer (142) with a second upper mold (32); taking out a sealing member (112) in the molded product (111A); and inserting the sealing member (112) into another molded product (111A).

3 Claims, 14 Drawing Sheets

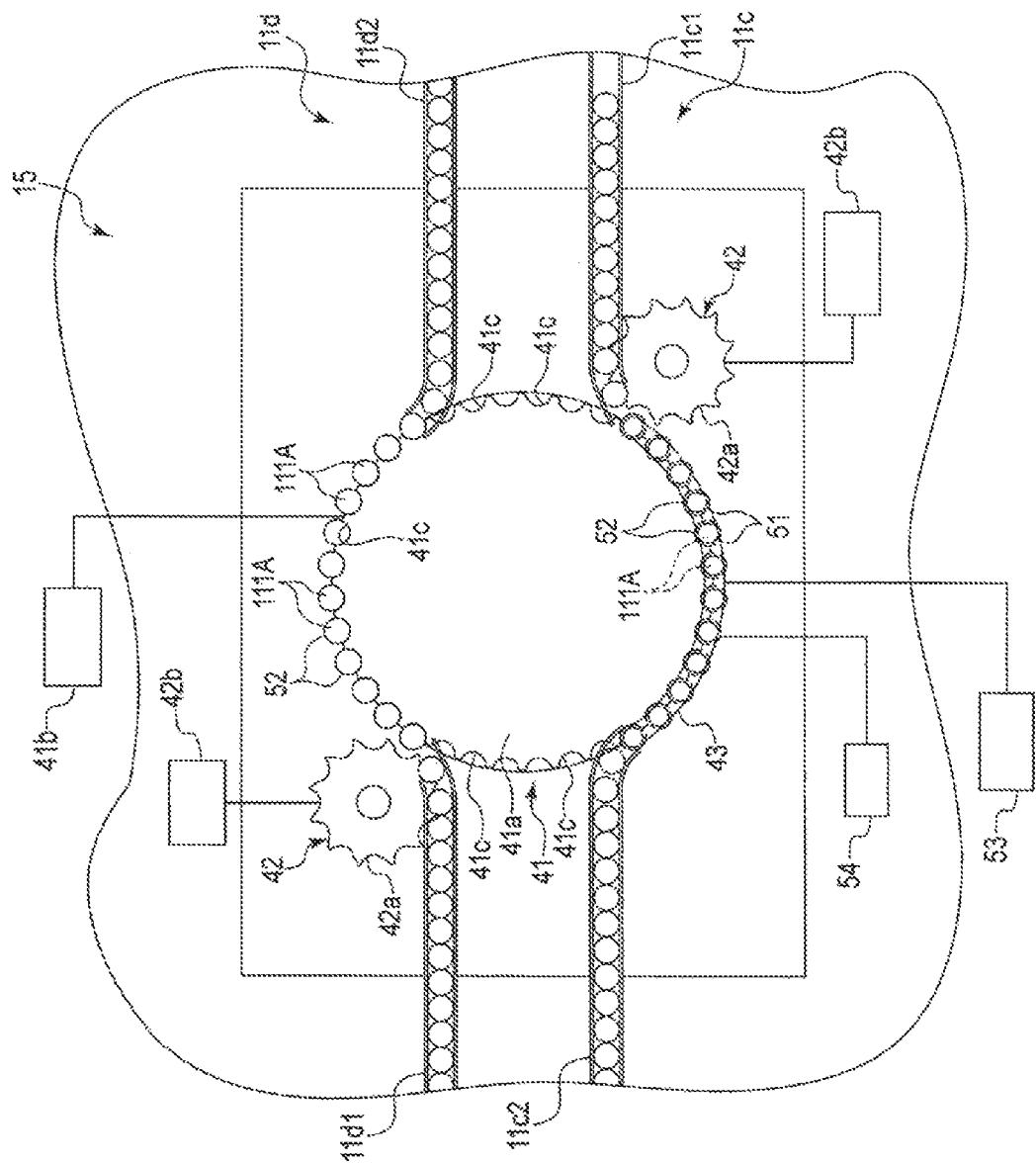
F I G. 4

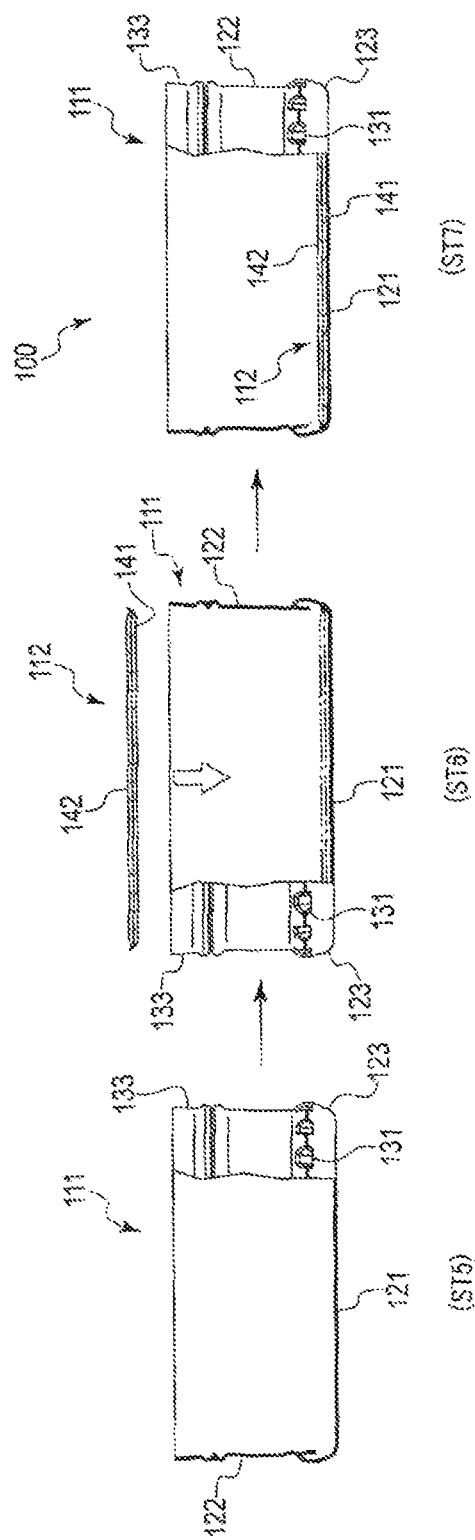
F I G. 10

MANUFACTURING METHOD OF CAP AND MANUFACTURING APPARATUS OF CAP

CROSS-REFERENCE TO RELATED APPLICATIONS

This application is based upon and claims the benefit of priority from Japanese Patent Application No. 2018-022326, filed Feb. 9, 2018, the entire contents of which are incorporated herein by reference.

BACKGROUND OF THE INVENTION

1. Field of the Invention

The present invention relates to a method and an apparatus for manufacturing a cap which seals a can container containing a beverage.

2. Description of the Related Art

Conventionally, a cap which seals a mouth portion of a can container has used a structure in which a sealing member made of a resin material in close contact with the mouth portion is provided on an inner surface of a cap body. In addition, as disclosed in Jpn. Pat. Appln. KOKAI Publication No. 2004-217295, there is known a cap in which a cap body and a sealing member are not bonded so as to reduce an opening torque at the time of opening a cap. In a case in which the cap body and the sealing member are not bonded, an inwardly projecting locking protrusion formed on a skirt portion of the cap body locks the sealing member such that the sealing member does not come off from the cap body.

However, in a case in which the sealing member is molded in the cap body, if the locking protrusion is formed on the skirt portion, an outer diameter of a molding die of the sealing member is required to be smaller than an inner diameter of the locking protrusion. Therefore, there is a problem that the molding or the shape of the sealing member is restricted. In addition, if the sealing member is molded inside the cap body and then processing such as forming a vent slit in the skirt portion of the cap main body is performed, the molding die of the vent slit and the sealing member come into contact with each other. Thus, there is a fear that contamination or the like will occur in the sealing member. Therefore, it is considered to remove the sealing member molded in the cap body from the cap body before the molding of the vent slit. However, there is a fear that the production efficiency will be lowered by the increase in the number of steps of inserting and removing the sealing member into and from the cap body.

BRIEF SUMMARY OF THE INVENTION

According to an aspect of embodiments, a manufacturing method of a cap includes: supplying a first resin material to a molded product having a top plate portion and a skirt portion integrally formed on the top plate portion through a curved corner portion having an annular shape; molding the first resin material of the molded product disposed in a first lower mold into a sliding layer having a predetermined shape with a first upper mold; supplying a second resin material to the sliding layer; molding the second resin material of the molded product disposed in a second lower mold into a sealing layer having a predetermined shape with a second upper mold; taking out a sealing member including the sliding layer and the sealing layer in the molded product; performing a predetermined molding on the molded product; and inserting the sealing member into another molded product different from the molded product on which the predetermined molding is performed.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a plan view schematically illustrating a configuration of essential parts used in the manufacturing apparatus of the cap;

FIG. 10 is a flowchart schematically illustrating a part of a cap manufacturing process using the manufacturing apparatus of the cap;

DETAILED DESCRIPTION OF THE INVENTION

Hereinafter, a manufacturing apparatus 1 and a manufacturing method of a cap 100 according to a first embodiment of the present invention will be described with reference to FIGS. 1 to 14.

Figure 1:
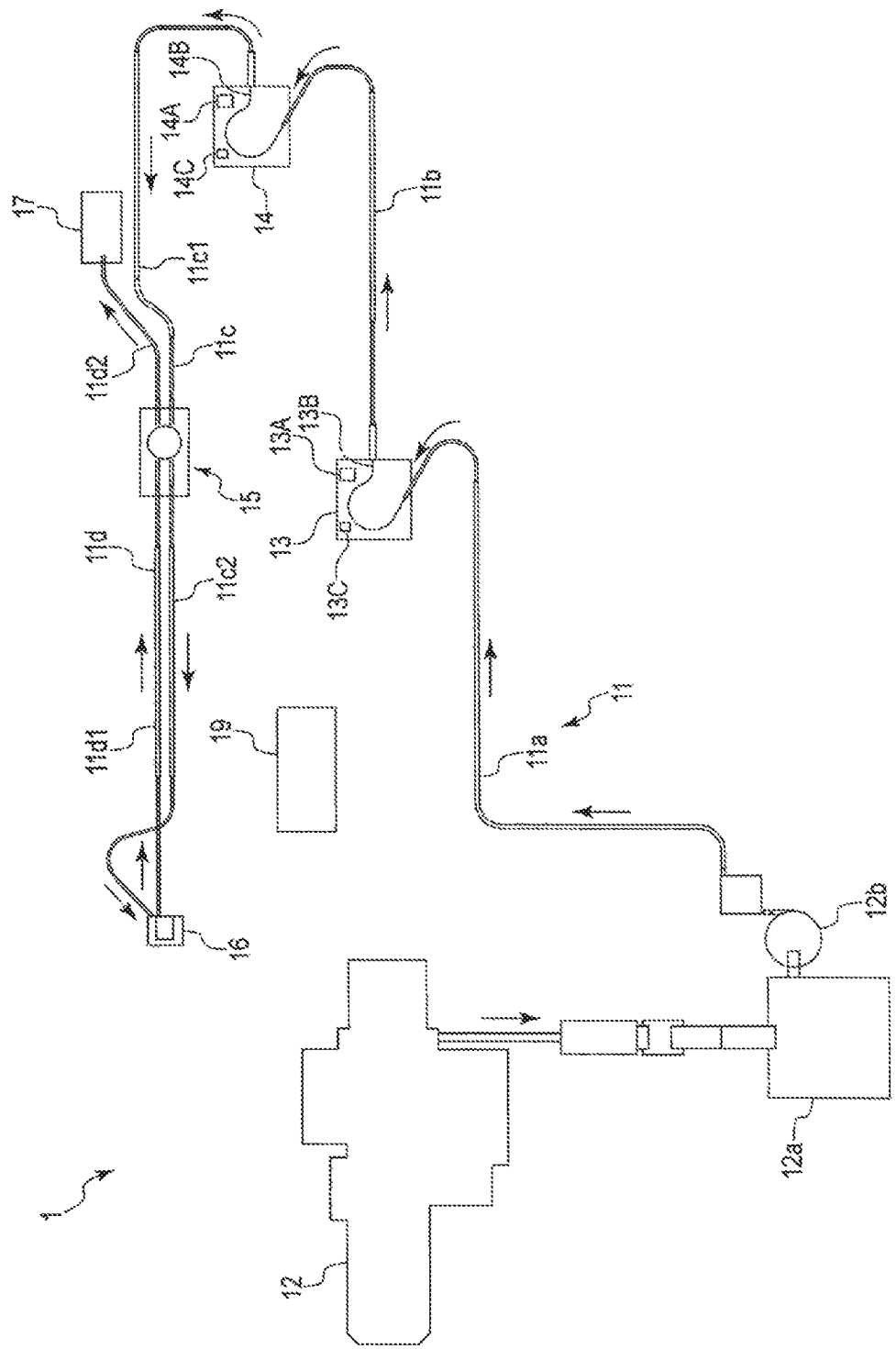
FIG. 1 is a plan view schematically illustrating a configuration of a manufacturing apparatus of a cap according to a first embodiment of the present invention.
Figure 2:
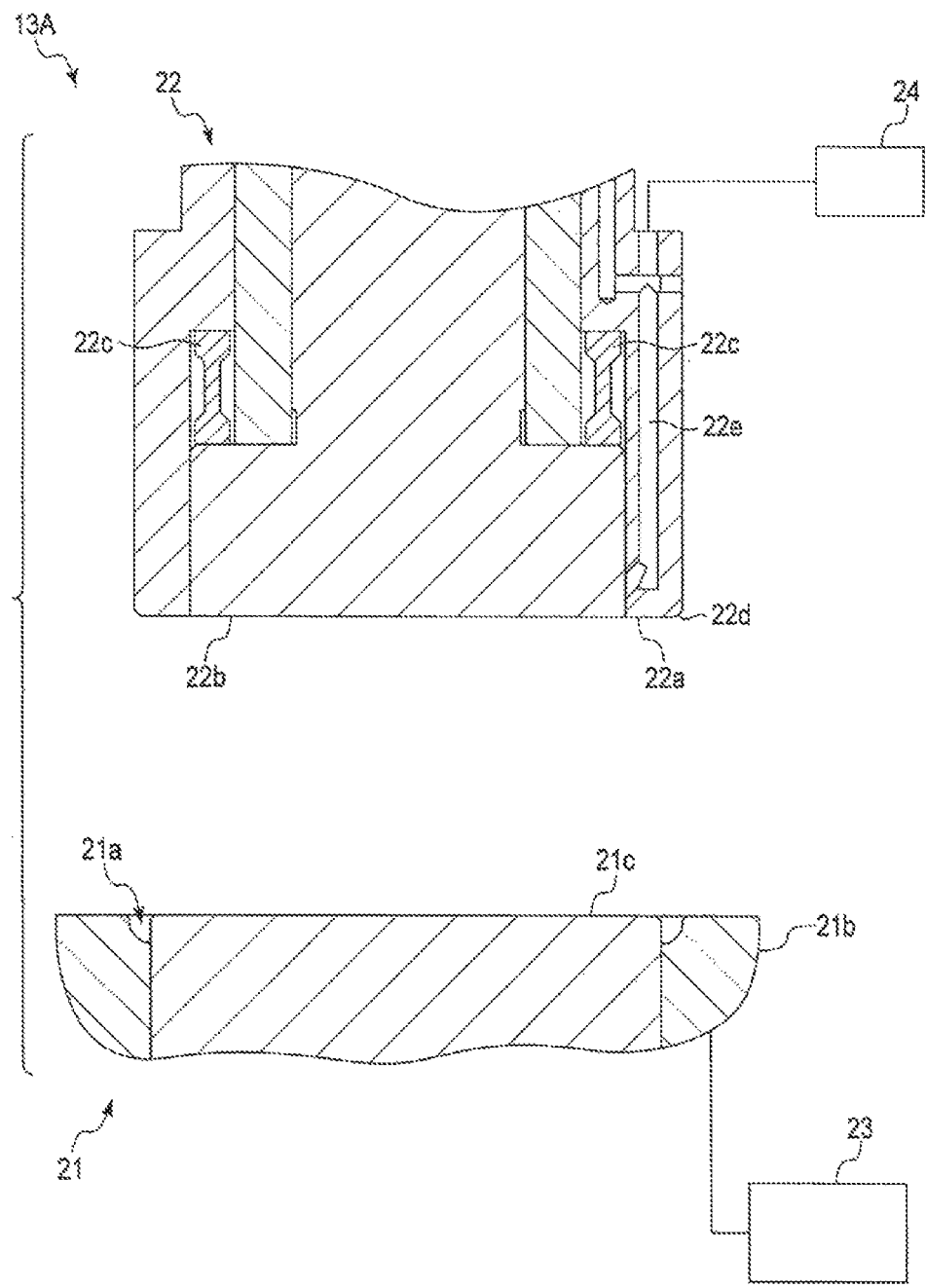
FIG. 2 is a cross-sectional view schematically illustrating a configuration of essential parts used in the manufacturing apparatus of the cap.
Figure 3:
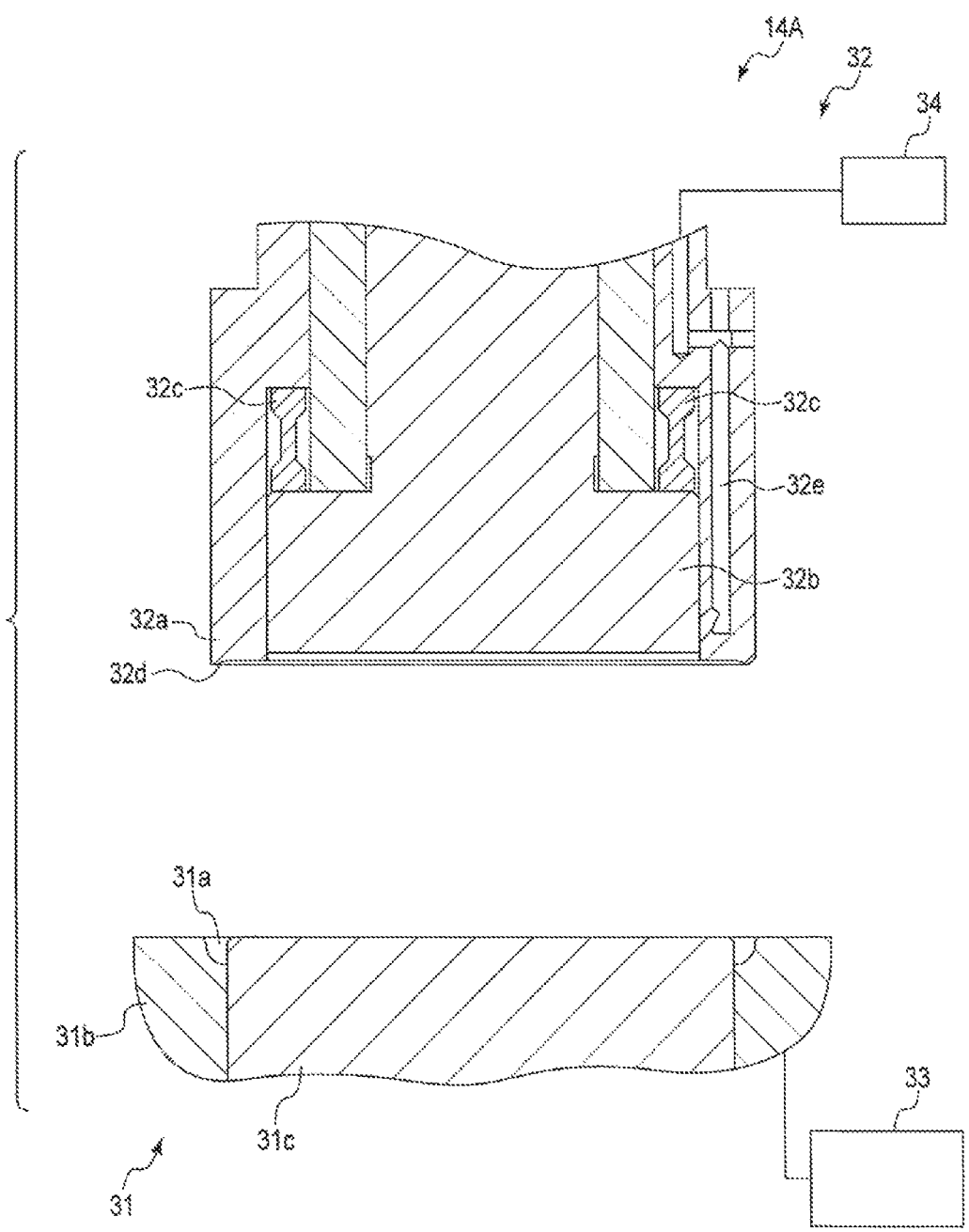
FIG. 3 is a cross-sectional view schematically illustrating a configuration of essential parts used in the manufacturing apparatus of the cap.
Figure 5:
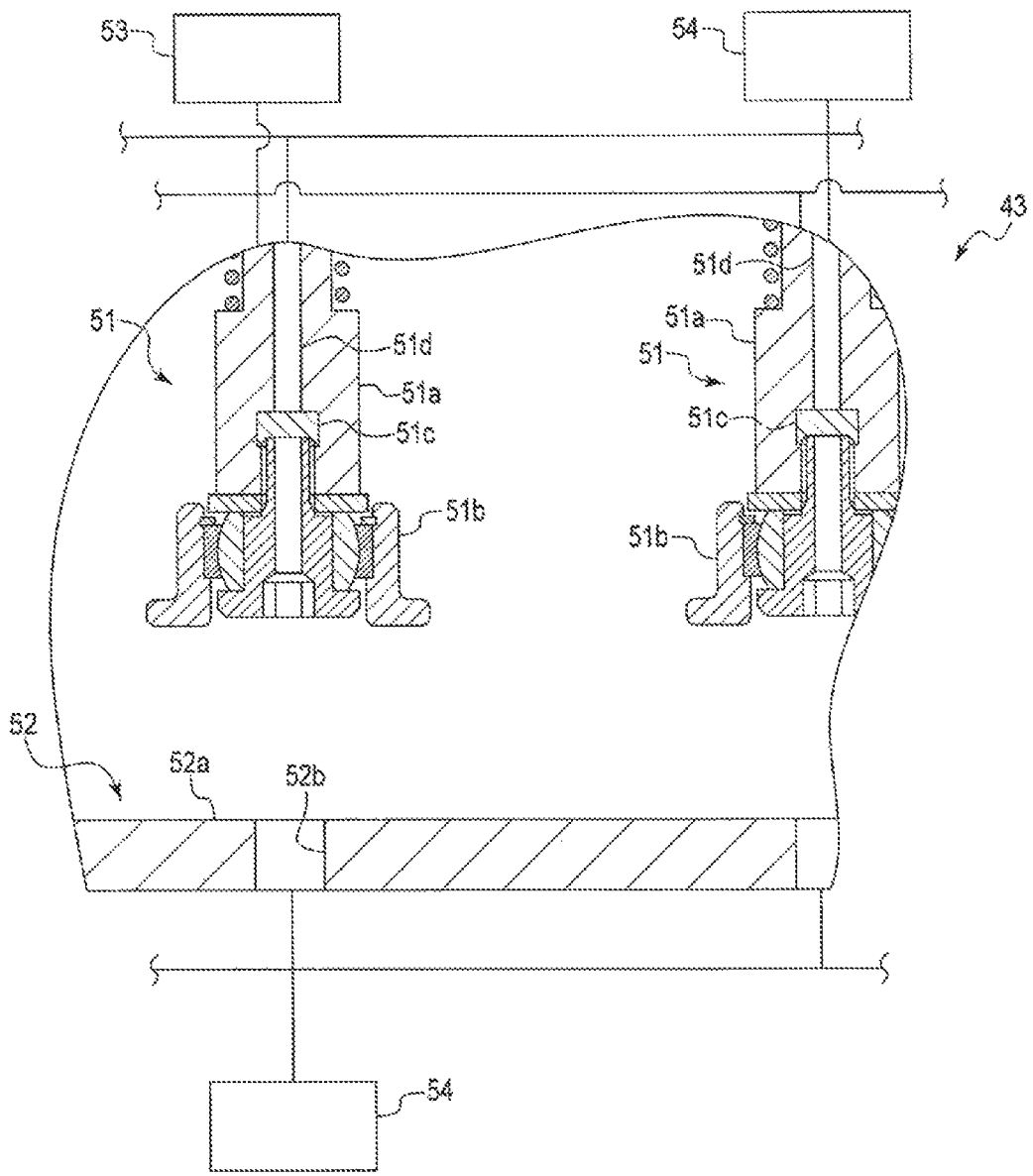
FIG. 5 is a cross-sectional view schematically illustrating a configuration of essential parts used in the manufacturing apparatus of the cap.
Figure 6:
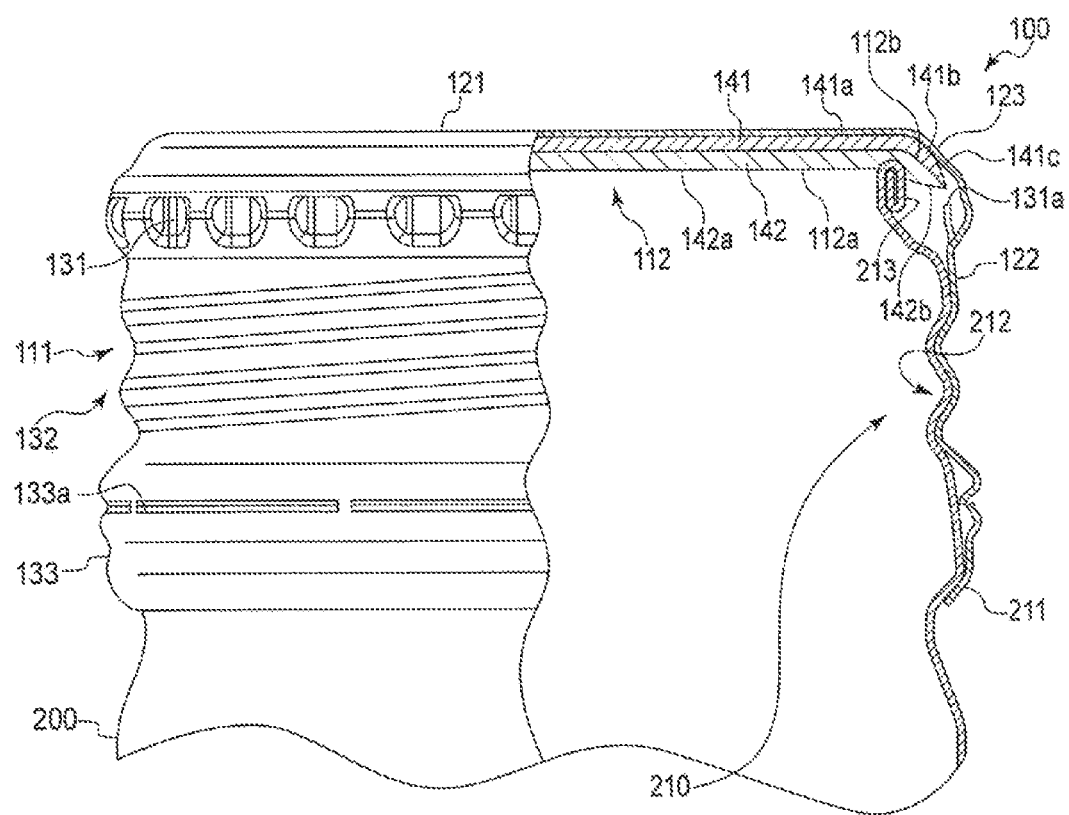
FIG. 6 is a partially cross-sectional side view schematically illustrating the configuration of the cap.
Figure 7:
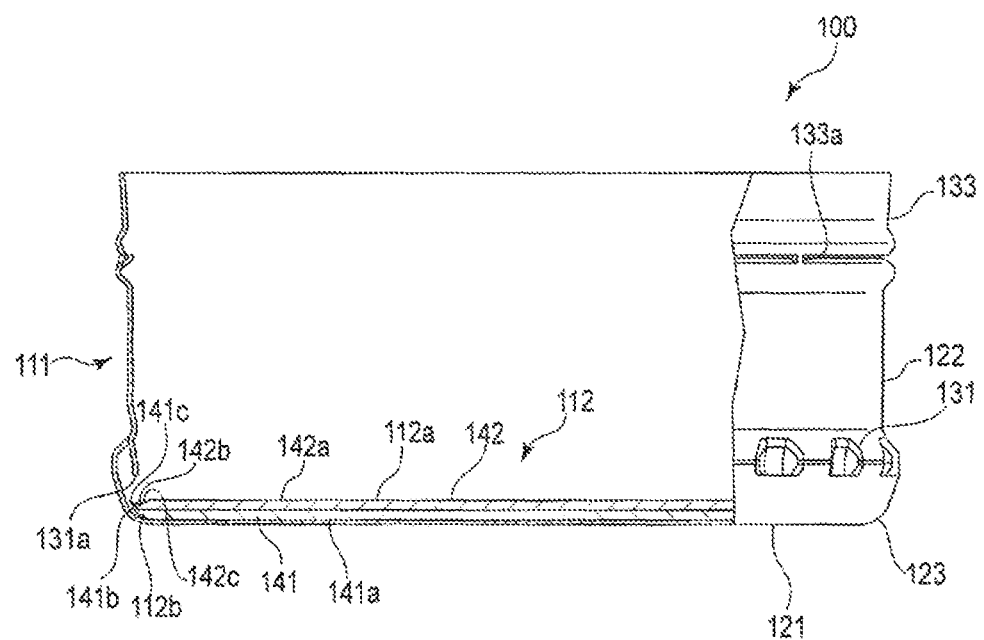
FIG. 7 is a partially cross-sectional side view schematically illustrating the configuration of the cap.
Figure 8:
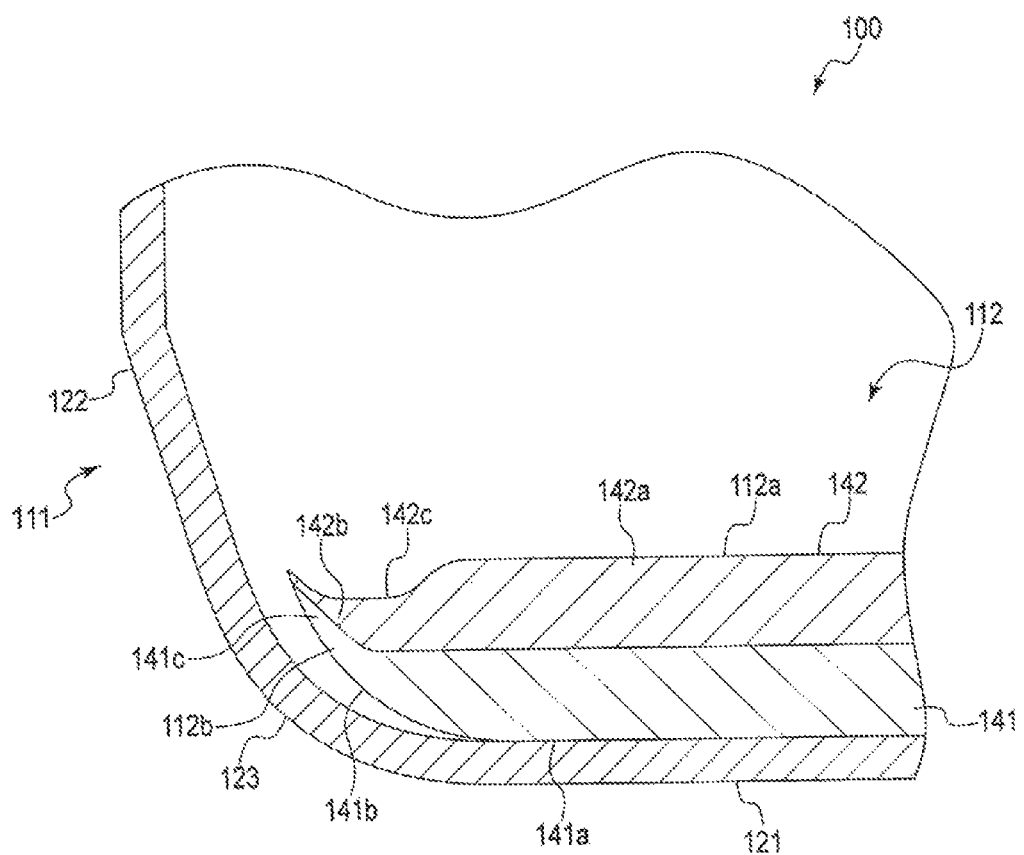
FIG. 8 is a cross-sectional view schematically illustrating a configuration of essential parts in the cap.

FIG. 1 is a plan view schematically illustrating the configuration of the manufacturing apparatus 1 of the cap 100 according to the first embodiment of the present invention. FIG. 2 is a cross-sectional view schematically illustrating a configuration of essential parts used in the manufacturing apparatus 1 of the cap 100. FIG. 3 is a cross-sectional view schematically illustrating a configuration of essential parts used in the manufacturing apparatus 1 of the cap 100. FIG. 4 is a plan view schematically illustrating a configuration of essential parts used in the manufacturing apparatus 1 of the cap 100. FIG. 5 is a cross-sectional view schematically illustrating a configuration of essential parts used in the manufacturing apparatus 1 of the cap 100. FIG. 6 is a partially cross-sectional side view schematically illustrating the configuration of the cap 100. FIG. 7 is a partially cross-sectional side view schematically illustrating the configuration of the cap 100. FIG. 8 is a cross-sectional view schematically illustrating a configuration of essential parts in the cap 100.

As illustrated in FIGS. 1 to 8, the manufacturing apparatus 1 is an apparatus to manufacture the cap 100 which is tightly caulked in a state of being capped by a mouth portion 210 of a can container 200 to be configured to seal the mouth portion 210.

First, the can container 200 and the cap 100 will be described. As illustrated in FIG. 6, the can container 200 is a so-called bottle type container which stores a beverage or the like. For example, the can container 200 is made of a metal material such as an aluminum alloy or a surface-treated steel plate having resin films laminated on both sides. The can container 200 is formed in a cylindrical shape having a different outer diameter, one end of which is reduced in diameter. The can container 200 includes the mouth portion 210 at one end portion so as to discharge the stored beverage. The mouth portion 210 includes a jaw portion 211, a male thread portion 212, and a curl portion 213 on the outer peripheral surface thereof from the bottom surface side to the end portion of the can container 200.

The jaw portion 211 is formed by protruding in an annular shape. The curl portion 213 is formed to be smaller in diameter than the male thread portion 212. In addition, the outer diameter of the curl portion 213 is formed to be smaller than the inner diameter of the cap 100. The curl portion 213 is formed by folding the end portion of the mouth portion 210 once or more times. The curl portion 213 constitutes an opening portion for discharging the beverage stored in the can container 200.

As illustrated in FIGS. 6 and 8, the cap 100 includes a cap body 111 and a sealing member 112 provided separately in the cap body 111.

The cap body 111 is made of a material in which a resin coating layer is formed on a metal material such as an aluminum alloy. The cap body 111 is configured by performed each molding such as drawing the material having a thin flat plate shape into a cup shape, knurling molding, and roll-on molding.

The cap body 111 includes a disk-shaped top plate portion 121 and a cylindrical skirt portion 122 integrally provided on the peripheral edge portion of the top plate portion 121. In the cap body 111, the top plate portion 121 and the skirt portion 122 are integrally and continuously formed by a corner portion 123 having an annular shape and a curved shape.

The top plate portion 121 is formed in a disk shape, and the main surface of the top plate portion 121 is formed in a flat surface. One end of the skirt portion 122 is continuous with the top plate portion 121 through the corner portion 123, and the other end of the skirt portion 122 is opened. The skirt portion 122 includes a plurality of knurl portions 131 having a vent slit 131a, a female thread portion 132, and a tamper evidence band portion 133 from the end portion on the top plate portion 121 side to the open end portion.

The knurl portion 131, the female thread portion 132, and the tamper evidence band portion 133 are formed by molding the cup-shaped molded product 111A by processing such as knurling molding or roll-on molding, the cup-shaped molded product 111A being provided with the top plate portion 121, the cylindrical skirt portion 122 in which the knurl portion 131, the female thread portion 132, and the tamper evidence band portion 133 are not molded, and the corner portion 123.

The knurl portion 131 has the vent slit 131a and protrudes from the inner peripheral surface of the skirt portion 122. The vent slit 131a is a notch which discharges gas in the can container 200 at the time of opening.

The female thread portion 132 is configured to be screwed with the male thread portion 212 of the can container 200. The female thread portion 132 is molded together with the can container 200. That is, the female thread portion 132 is not molded in the finished product of the cap 100 before attached to the can container 200, and is molded when integrally combined with the can container 200.

The tamper evidence band portion 133 is engaged with the jaw portion 211 of the can container 200 in a direction in which the cap 100 separates from the can container 200 and in an axial direction of the cap 100. In addition, the tamper evidence band portion 133 has a break portion 133a which breaks off when the cap 100 is opened and detaching from the skirt portion 122. That is, the tamper evidence band portion 133 is configured in such a manner that a slit is formed by leaving the break portion 133a at the end portion side of the skirt portion 122, and as in the female thread portion 132, when integrally combined with the can container 200, the tamper evidence band portion 133 is shaped to fit the shape of the jaw portion 211 of the can container 200 and engaged with the jaw portion 211.

The sealing member 112 is configured separately from the cap body 111. The sealing member 112 is formed in a disk shape having an outer diameter larger than a diameter of an inscribed circle of the knurl portion 131 provided in the skirt portion 122 of the cap body 111. The sealing member 112 is integrally provided in the cap body 111 by engaging with the vent slit 131a of the knurl portion 131, which protrudes in the radial direction from the inner peripheral surface of the skirt portion 122, in the axial direction of the cap body 111.

The sealing member 112 includes a disk-shaped sliding layer 141 and a disk-shaped sealing layer 142 integrally laminated on the sliding layer 141. The sealing member 112 is configured by integrally molding the sliding layer 141 and the sealing layer 142 with different resin materials. The sealing member 112 includes a flat plate portion 112a having a uniform thickness, and a curved surface portion 112b, of which an outer peripheral edge on the top plate portion 121 side is formed with a curved surface. In other words, the sealing member 112 is formed in a disk shape, and a ridge portion on the top plate portion 121 side is configured with a curved surface having a predetermined curvature.

The sliding layer 141 is made of a resin material having a hardness higher (harder) than that of the sealing layer 142. In addition, the sliding layer 141 is made of a resin material having no adhesion and viscosity with the resin coating layer of the cap body 111. That is, the sliding layer 141 is not bonded to the top plate portion 121 and slides on the top plate portion 121 in a state of being in contact with the top plate portion 121.

The resin material used for the sliding layer 141 includes an olefin-based resin such as a polypropylene resin or a polyethylene resin, a polyester-based resin such as polyethylene terephthalate, a styrene resin, an acryl-based resin, and the like. In the present embodiment, the sliding layer 141 is made of, for example, a polypropylene resin. Note that a pigment, a lubricant, a softener, or the like can be appropriately added to the resin material used for the sliding layer 141.

The sliding layer 141 faces the top plate portion 121 of the cap body 111 and is provided separately from the cap body 111. The sliding layer 141 is configured to be slidable with the top plate portion 121 of the cap body 111 by the resin material used. The sliding layer 141 is formed in a disk shape. The outer diameter of the sliding layer 141 is configured to be smaller than the inner diameter of the skirt portion 122, to be substantially the same diameter as the inscribed circle of the knurl portion 131 or slightly smaller than the inscribed circle of the knurl portion 131, and to be larger than the outer diameter of the curl portion 213 of the mouth portion 210.

The sliding layer 141 includes a first flat plate portion 141a having a uniform thickness, a first curved surface portion 141b in which the outer surface of the outer peripheral edge on the top plate portion 121 side is formed by a curved surface, and a protrusion portion 141c provided on the sealing layer 142 side of the first curved surface portion 141b. The first flat plate portion 141a is configured such that the thickness of the portion from the center of the sliding layer 141 to the outer peripheral side of the portion of the sliding layer 141 facing the curl portion 213 of the mouth portion 210 is uniform.

The first curved surface portion 141b is configured such that the thickness of the portion from the outer peripheral side of the portion facing the curl portion 213 of the mouth portion 210 to the outer peripheral edge gradually decreases toward the outer peripheral edge. The protrusion portion 141c is formed in an annular protruding shape that is inclined with respect to the axial direction of the sliding layer 141 and the surface direction of the top plate portion 121 and is curved or inclined toward the open end side of the skirt portion 122. The protrusion portion 141c gradually decreases in thickness from the first curved surface portion 141b to the tip end.

The sealing layer 142 is made of a resin material having a relatively lower (softer) hardness than the sliding layer 141. Examples of the resin material used for the sealing layer 142 include an olefin-based resin, a polyester-based resin, a styrene-based resin, and an acryl-based resin, and more preferably, a blend material of a styrene-based elastomer and a polypropylene resin, a blend material of a low-density polyethylene and styrene-based elastomer, and a polyester-based elastomer. In the present embodiment, the sealing layer 142 is made of, for example, a mixed material of a styrene-based elastomer and a polypropylene resin. Note that a pigment, a lubricant, a softener, or the like can be appropriately added to the resin material used for the sealing layer 142.

The sealing layer 142 is integrally provided on the main surface of the sliding layer 141 on the side facing the mouth portion 210. The sealing layer 142 is formed in a disk shape. The outer diameter of the sealing layer 142 is configured to be smaller than the inner diameter of the skirt portion 122, to be substantially the same diameter as the inscribed circle of the knurl portion 131 or slightly larger than the inscribed circle of the knurl portion 131, and to be larger than the outer diameter of the curl portion 213 of the mouth portion 210. That is, the outer diameter of the sealing layer 142 is configured to be the same as the outer diameter of the sliding layer 141, or to be larger than the outer diameter of the sliding layer 141.

The sealing layer 142 includes a second flat plate portion 142a having a uniform thickness, a second curved surface portion 142b in which the outer surface of the outer peripheral edge on the top plate portion 121 side is formed by a curved surface, and an annular concave portion 142c provided on the main surface of the second curved surface portion 142b opposite to the sliding layer 141 side. The second flat plate portion 142a is configured such that the main surface facing the curl portion 213 is formed with a flat surface. For example, the second flat plate portion 142a is configured to have the same diameter as the first flat plate portion 141a of the sliding layer 141. The second flat plate portion 142a constitutes the flat plate portion 112a of the sealing member 112 together with the first flat plate portion 141a. Note that, in the present embodiment, the first flat plate portion 141a and the second flat plate portion 142a are set to have the same thickness.

The second curved surface portion 142b has, for example, the main surface flush with the main surface of the second flat plate portion 142a facing the curl portion 213. The second curved surface portion 142b is configured such that the thickness of the portion from the outer peripheral side of the portion facing the curl portion 213 of the mouth portion 210 to the outer peripheral edge gradually decreases toward the outer peripheral edge. The second curved surface portion 142b is laminated on the first curved surface portion 141b and the protrusion portion 141c. The second curved surface portion 142b forms the curved surface portion 112b of the sealing member 112 together with the first curved surface portion 141b and the protrusion portion 141c.

The concave portion 142c abuts against the vent slit 131a when the cap 100 is in a posture in which the top plate portion 121 faces upward and the sealing member 112 drops downward from the top plate portion 121. The concave portion 142c is, for example, an annular recess having a semicircular cross-section.

The sliding layer 141 and the sealing layer 142 are configured such that each of the first curved surface portion 141b, the protrusion portion 141c, and the second curved surface portion 142b is thinner than the first flat plate portion 141a and the second flat plate portion 142a.

Next, the manufacturing apparatus 1 of the cap 100 will be described with reference to FIGS. 1 to 5.

The manufacturing apparatus 1 is installed in a factory and constitutes a mass production line of the cap 100. The manufacturing apparatus 1 includes a conveying device 11, a shell press device 12, a sliding layer molding device 13, a sealing layer molding device 14, a sealing member conveying device 15, and a molded product processing device 16. In addition, the manufacturing apparatus 1 includes a control device 19 which is connected to the conveying device 11, the shell press device 12, the sliding layer molding device 13, the sealing layer molding device 14, the sealing member conveying device 15, and the molded product processing device 16 and controls each component at the time of manufacturing the cap 100 by a prestored program.

The manufacturing apparatus 1 manufactures the cap 100 by conveying the molded product 111A of the cap body 111 molded using the shell press device 12 by the conveying device 11, molding the sealing member 112 by the sliding layer molding device 13 and the sealing layer molding device 14, taking out the sealing member 112 from the molded product 111A by the sealing member conveying device 15, molding the cap body 111 from the molded product 111A by the molded product processing device 16, and inserting the sealing member 112 into the molded product 111A by the sealing member conveying device 15.

The conveying device 11 conveys the molded product 111A molded by the shell press device 12 in the order of the sliding layer molding device 13, the sealing layer molding device 14, the sealing member conveying device 15, the molded product processing device 16, and the sealing member conveying device 15. In addition, the conveying device 11 conveys the completed cap body 111 to a collecting portion 17 such as a container which collects the cap body 111 so as to convey the completed cap body 111 to a subsequent process which is an inspecting and packaging process.

Here, the molded product 111A is formed in a cup shape including a top plate portion 121, a cylindrical skirt portion 122 in which a knurl portion 131, a female thread portion 132, and a tamper evidence band portion 133 are not molded, and a corner portion 123.

The conveying device 11 is, for example, a rail which is provided across each device and continuously conveys the molded product 111A in a row. As a specific example, the conveying device 11 includes a first rail 11a provided between the shell press device 12 and the sliding layer molding device 13, a second rail 11b provided between the sliding layer molding device 13 and the sealing layer molding device 14, a third rail 11c provided between the sealing layer molding device 14 and the molded product processing device 16, and a fourth rail 11d provided between the molded product processing device 16 and the collecting portion 17.

In addition, the middle portion of the third rail 11c and the middle portion of the fourth rail 11d are connected to the sealing member conveying device 15 disposed between the sealing layer molding device 14 and the molded product processing device 16 and between the molded product processing device 16 and the collecting portion 17.

As a specific example, the third rail 11c supplies the molded product 111A from the sealing layer molding device 14 to the sealing member conveying device 15, and supplies the molded product 111A from the sealing member conveying device 15 to the molded product processing device 16. That is, the third rail 11c is constituted by two rails 11c1 and 11c2 divided in the sealing member conveying device 15.

Similarly, the fourth rail 11d supplies the molded product 111A from the molded product processing device 16 to the sealing member conveying device 15, and supplies the molded product 111A from the sealing member conveying device 15 to the collecting portion 17. That is, the fourth rail 11d is constituted by two rails 11d1 and 11d2 divided in the sealing member conveying device 15.

The shell press device 12 is a press machine which molds the molded product 111A by drawing a sheet-shaped metal material. The shell press device 12 includes a storage portion 12a which temporarily stores the molded product 111A and a supplying portion 12b which supplies the molded product 111A from the storage portion 12a to the conveying device 11.

The sliding layer molding device 13 includes a first mold 13A, a conveying mechanism 13B, and a material supplying device 13C.

As illustrated in FIG. 2, the first mold 13A includes a first lower mold 21, a first upper mold 22, a first lower mold driving device 23 connected to the first lower mold 21 and driving the first lower mold 21, and a gas supplying device 24 connected to the first upper mold 22. In the first mold 13A, the first upper mold 22 constitutes a fixed mold, and the first lower mold 21 constitutes a movable mold which moves with respect to the first upper mold 22.

The first lower mold 21 is configured to be able to hold the molded product 111A. The first lower mold 21 has a recess 21a which holds the molded product 111A. In addition, the first lower mold 21 includes a first movable mold 21b and a second movable mold 21c. In the first lower mold 21, a recess 21a is formed by the first movable mold 21b and the second movable mold 21c.

The recess 21a supports the molded product 111A in a state of abutting against the outer surface of the top plate portion 121 of the molded product 111A and at least a part of the outer peripheral surface of the corner portion 123. In other words, the recess 21a is a recess configured to have the same shape as a part of the outer shape of the top plate portion 121 of the molded product 111A and a part of the outer shape of the corner portion 123.

Note that the depth of the recess 21a, in other words, the height from the upper surface of the first lower mold 21 to the bottom surface of the recess 21a may be configured to equal the sum of the thickness of the top plate portion 121 and the thickness of the sealing member 112.

The first movable mold 21b is connected to the first lower mold driving device 23 and configured to be able to reciprocate in one direction with respect to the first upper mold 22. The first movable mold 21b is formed in, for example, a cylindrical shape. The second movable mold 21c is formed in a columnar shape and provided so as to be able to reciprocate in the height direction at the opening of the center of the first movable mold 21b. When the first movable mold 21b reciprocates in one direction by the first lower mold driving device 23, the second movable mold 21c reciprocates in the one direction along with the first movable mold 21b. In addition, the second movable mold 21c reciprocates, relative to the first movable mold 21b, between a position constituting the recess 21a together with the first movable mold 21b and a position at which the upper surface of the second movable mold 21c is flush with the upper surface of the first movable mold 21b. For example, the second movable mold 21c is constantly urged toward the first upper mold 22 by a biasing member such as a spring, such that the upper surface of the second movable mold 21c is flush with the upper surface of the first movable mold 21b, and is pressed by the first upper mold 22 through the molded product 111A, such that the recess 21a is configured together with the first movable mold 21b.

The first movable mold 21b and the second movable mold 21c of the first lower mold 21 reciprocate between a position at which the first upper mold 22 and the mounted molded product 111A are separated from each other and a position which is separated by the same distance as the thickness of the sliding layer 141 from the inner surface of the top plate portion 121 of the mounted molded product 111A to the tip end surface of the first upper mold 22.

In the first upper mold 22, the sliding layer 141 of the sealing member 112 is molded on the inner surface of the top plate portion 121 in the molded product 111A. The first upper mold 22 includes a cylindrical first molding portion 22a, a columnar second molding portion 22b provided at the opening of the center of the first molding portion 22a and fixed to the first molding portion 22a, and a regulating member 22c which regulates the relative positions of the first molding portion 22a and the second molding portion 22b. Note that, in the first upper mold 22, the positions of the first molding portion 22a and the second molding portion 22b are regulated in a state in which the tip end surface of the first molding portion 22a and the tip end surface of the second molding portion 22b are flush with each other, and the first molding portion 22a and the second molding portion 22b are integrally fixed.

The first molding portion 22a has a chamfered portion 22d at a ridge portion of a tip end opposite to the first lower mold 21. The outer diameter of the first molding portion 22a is configured to be the same as the inner diameter of the skirt portion 122 or slightly smaller than the extent that no resin material flows in. Note that, here, the slightly small diameter to the extent that no resin material flows in is appropriately determined according to various conditions such as the viscosity, temperature, pressure, or the like of the resin material to be used. That is, the slightly small diameter to the extent that no resin material flows in refers to a diameter capable of obtaining a clearance to the extent that inflow of the resin material between the first molding portion 22a and the skirt portion 122 can be prevented when the resin material is pressed by the first upper mold 22. The chamfered portion 22d is provided on the ridge portion which is formed of the outer peripheral surface and the end surface of the first molding portion 22a facing the first lower mold 21. The chamfered portion 22d is an annular flat surface.

In addition, the first molding portion 22a has a flow passage 22e through which gas flows. In the flow passage 22e, the end portion on the primary side is connected to the gas supplying device 24, and the end portion on the secondary side opens to the inner peripheral surface on one end side of the first molding portion 22a facing the first lower mold 21. The flow passage 22e constitutes a gas flow passage which transfers gas from the gas supplying device 24 to the opening on the inner peripheral surface of the first molding portion 22a and discharges gas to the tip end surface of the first upper mold 22 through the gap between the first molding portion 22a and the second molding portion 22b.

The second molding portion 22b is formed in a columnar shape in which the end surface on one end side facing the second lower mold 31 is formed in a planar shape. The regulating member 22c fixes the first molding portion 22a and the second molding portion 22b at a position at which the tip end surface of the second molding portion 22b is flush with the tip end surface of the first molding portion 22a.

The conveying mechanism 13B moves the molded product 111A conveyed to the sliding layer molding device 13 by the conveying device 11 along each step in the sliding layer molding device 13 and also moves the molded product 111A to the conveying device 11 on the secondary side of the sliding layer molding device 13.

The material supplying device 13C melts or softens the resin material for molding the sliding layer 141 and supplies a predetermined amount of the resin material to the molded product 111A.

The sealing layer molding device 14 includes a second mold 14A, a conveying mechanism 14B, and a material supplying device 14C.

As illustrated in FIG. 3, the second mold 14A includes a second lower mold 31, a second upper mold 32, a second lower mold driving device 33 connected to the second lower mold 31 and driving the second lower mold 31, and a gas supplying device 34 connected to the second upper mold 32. In the second mold 14A, the second upper mold 32 constitutes a fixed mold, and the second lower mold 31 constitutes a movable mold which moves with respect to the second upper mold 32.

The second lower mold 31 is configured to be able to hold the molded product 111A. The second lower mold 31 has a recess 31a which holds the molded product 111A. In addition, the second lower mold 31 includes a first movable mold 31b and a second movable mold 31c. In the second lower mold 31, a recess 31a is formed by the first movable mold 31b and the second movable mold 31c.

The recess 31a supports the molded product 111A in a state of abutting against the outer surface of the top plate portion 121 of the molded product 111A and at least a part of the outer peripheral surface of the corner portion 123. In other words, the recess 31a is a recess configured to have the same shape as the outer shape of the top plate portion 121 of the molded product 111A and a part of the outer shape of the corner portion 123.

Note that the depth of the recess 31a, in other words, the height from the upper surface of the second lower mold 31 to the bottom surface of the recess 31a may be configured to be the same as the sum of the thickness of the top plate portion 121 and the thickness of the sealing member 112.

The first movable mold 31b is connected to the second lower mold driving device 33 and configured to be able to reciprocate in one direction with respect to the second upper mold 32. The first movable mold 31b is formed in, for example, a cylindrical shape. The second movable mold 31c is formed in a columnar shape and provided so as to be able to reciprocate in the height direction at the opening of the center of the first movable mold 31b. When the first movable mold 31b reciprocates in one direction by the second lower mold driving device 33, the second movable mold 31c reciprocates in the one direction along with the first movable mold 31b. The second movable mold 31c reciprocates, relative to the first movable mold 31b, between a position constituting the recess 31a together with the first movable mold 31b and a position at which the upper surface of the second movable mold 31c is flush with the upper surface of the first movable mold 31b. For example, the second movable mold 31c is constantly urged toward the second upper mold 32 by a biasing member such as a spring, such that the upper surface of the second movable mold 31c is flush with the upper surface of the first movable mold 31b, and is pressed by the second upper mold 32 through the molded product 111A, such that the recess 31a is configured together with the first movable mold 31b.

The first movable mold 31b and the second movable mold 31c of the second lower mold 31 reciprocate between a position at which the second upper mold 32 and the mounted molded product 111A are separated from each other and a position which is separated by the same distance as the thickness of the sealing member 112 from the inner surface of the top plate portion 121 of the mounted molded product 111A to the tip end surface of the second upper mold 32.

In the second upper mold 32, the sealing layer 142 of the sealing member 112 is molded on the sliding layer 141 in the molded product 111A. The second upper mold 32 includes a cylindrical first molding portion 32a, a columnar second molding portion 32b provided at the opening of the center of the first molding portion 32a and relatively moves with respect to the first molding portion 32a, and a regulating member 32c which regulates the relative positions of the first molding portion 32a and the second molding portion 32b.

In the second upper mold 32, the first molding portion 32a is fixed and the second molding portion 32b reciprocates with respect to the second molding portion 32b in one direction.

The first molding portion 32a is formed in a cylindrical shape in which the ridge portion which is formed of the outer peripheral surface and the end surface on one end side opposed to the second lower mold 31 is not chamfered. The first molding portion 32a has an annular protrusion portion 32d in which a tip end surface is formed in a flat shape and a longitudinal cross-section on the outer peripheral edge side of the tip end surface is semicircular.

The first molding portion 32a reciprocates with respect to the second molding portion 32b in one direction between a position at which the tip end surface of the first molding portion 32a is flush with the tip end surface of the second molding portion 32b and a position which protrudes from the tip end surface of the second molding portion 32b by about 0.1 mm to 2 mm such that the second molding portion 32b retreats to the inside of the first molding portion 32a.

For example, the first molding portion 32a is constantly urged toward the second lower mold 31 by a biasing member such as a spring, such that the tip end surface is positioned at a position protruding from the tip end surface of the second molding portion 32b, and is pressed by the second lower mold 31 through the molded product 111A, such that the tip end surface is flush with the tip end surface of the second molding portion 32b.

In addition, the first molding portion 32a has a flow passage 32e through which gas flows. In the flow passage 32e, the end portion on the primary side is connected to the gas supplying device 34, and the end portion on the secondary side opens to the inner peripheral surface on one end side of the first molding portion 32a facing the second lower mold 31. The flow passage 32e constitutes a gas flow passage which transfers gas from the gas supplying device 34 to the opening on the inner peripheral surface of the first molding portion 32a and discharges gas to the tip end surface of the second upper mold 32 through the gap between the first molding portion 32a and the second molding portion 32b.

The second molding portion 32b is formed in a columnar shape in which the end surface on one end side facing the second lower mold 31 is formed in a planar shape. The second molding portion 32b is provided at the opening of the center of the first molding portion 32a and fixed thereto.

The regulating member 32c regulates the protruding position of the urged first molding portion 32a with respect to the second molding portion 32b.

The gas supplying device 34 supplies gas, for example, air or inert gas, to the flow passage 32e.

The conveying mechanism 14B moves the molded product 111A including the sliding layer 141 conveyed to the sealing layer molding device 14 by the conveying device 11 along each step in the sealing layer molding device 14 and also moves the molded product 111A to the conveying device 11 on the secondary side of the sealing layer molding device 14.

The material supplying device 14C melts or softens the resin material for molding the sealing layer 142 and supplies a predetermined amount of the resin material to the sliding layer 141 disposed in the molded product 111A.

The sealing member conveying device 15 is connected to the third rail 11c disposed between the sealing layer molding device 14 and the molded product processing device 16 and connected to the fourth rail 11d disposed between the molded product processing device 16 and the collecting portion 17. The sealing member conveying device 15 includes a holding mechanism 41 which holds a plurality of molded products 111A, two supplying mechanisms 42 which supply the molded products 111A to the holding mechanism 41 at predetermined intervals, and a sealing member conveying mechanism 43 which conveys the sealing members 112 of the plurality of molded products 111A held by the holding mechanism 41.

As illustrated in FIG. 4, the holding mechanism 41 includes a disk-shaped first rotating body 41a and a driving mechanism 41b which rotates the first rotating body 41a. The first rotating body 41a has a plurality of semicircular notches 41c on the outer peripheral surface thereof. The radius of curvature of the notch 41c is formed to be the same as the radius of the outer peripheral surface of the molded product 111A.

The first rotating body 41a arranges the molded product 111A supplied from the rail 11c1 on the primary side of the third rail 11c in the notch 41c and conveys the molded product 111A to the rail 11c2 on the secondary side of the third rail 11c. In addition, in the first rotating body 41a, the plurality of notches 41c are disposed between the rail 11c1 and the rail 11c2.

In addition, the first rotating body 41a arranges the molded product 111A supplied from the rail 11d1 on the primary side of the fourth rail 11d in the notch 41c and conveys the molded product 111A to the rail 11d2 on the secondary side of the fourth rail 11d. In addition, in the first rotating body 41a, the plurality of notches 41c are disposed between the rail 11d1 and the rail 11d2.

That is, the first rotating body 41a rotates to sequentially convey the molded product 111A supplied from the rail 11c1 on the primary side of the third rail 11c and the rail 11d1 on the primary side of the fourth rail 11d to the rail 11c2 and the rail 11d2 on the secondary side, thereby constituting a part of the conveying path of the conveying device 11. In addition, in the first rotating body 41a, notches 41c arranged between the rails 11c1 and 11c2 of the third rail 11c are the same in number as those arranged between the rails 11d1 and 11d2 of the fourth rail 11d. In the present embodiment, twelve notches are respectively arranged.

The driving mechanism 41b rotates and stops the first rotating body 41a. The driving mechanism 41b is constituted by a motor, a transmission medium which transmits rotation, and the like.

The supplying mechanism 42 includes a second rotating body 42a and a driving mechanism 42b which rotates the second rotating body 42a. The second rotating body 42a supplies the molded product 111A from the rail 11c1 or the rail 11d1 to the notch 41c of the first rotating body 41a.

For example, the two supplying mechanisms 42 are respectively provided at the end portions of the rail 11c1 on the primary side of the third rail 11c and the end portions of the rail 11d1 on the primary side of the fourth rail 11d.

As illustrated in FIGS. 4 and 5, the sealing member conveying mechanism 43 includes a plurality of first adsorbing devices 51 which adsorb the sealing member 112, a pair of groups, each including second adsorbing devices 52 which adsorb the molded product 111A, a conveying device 53 which conveys the plurality of first adsorbing devices 51, and a vacuum pump device 54.

The first adsorbing device 51 includes a base portion 51a, a vacuum pad 51b, a bearing 51c, and a ventilation path 51d. The plurality of first adsorbing devices 51 are arranged in the same arrangement as the notches 41c of the first rotating body 41a arranged between the rail 11c1 and the rail 11c2 (rails 11d1 and 11d2). The number of first adsorbing device 51 is the same as the number of notches 41c disposed between the rail 11c1 and the rail 11c2 (rail 11d1 and rail 11d2). In the present embodiment, twelve first adsorbing devices 51 are provided.

The base portion 51a has the ventilation path 51d constituting a flow path of suctioned air. The base portion 51a is provided with the bearing 51c and holds the vacuum pad 51b through the bearing 51c.

The bearing 51c swingably supports the vacuum pad 51b with respect to the base portion 51a. The vacuum pad 51b is formed in a cylindrical shape in which the outer diameter of the tip end is smaller than the outer diameter of the sealing member 112, and the tip end is formed in a flat shape. The tip end of the vacuum pad 51b is an adsorbing surface which comes into close contact with the sealing member 112.

The ventilation path 51d is connected to the vacuum pump device 54 and constitutes a circuit which sets the inside of the vacuum pad 51b to negative pressure.

The second adsorbing device 52 includes a placement portion 52a on which the molded product 111A is placed and a ventilation path 52b provided in the placement portion 52a. The plurality of second adsorbing devices 52 are arranged in the same arrangement as the notches 41c of the first rotating body 41a arranged between the rail 11c1 and the rail 11c2. One of the group of second adsorbing devices 52 is disposed between the rail 11c1 and the rail 11c2, and the other the group of second adsorbing devices 52 is disposed between the rail 11d1 and the rail 11d2.

That is, two groups of second adsorbing devices 52 simultaneously holds the molded product 111A held by the notch 41c of the first rotating body 41a conveyed from the rail 11c1 to the rail 11c2 and the molded product 111A held by the notch 41c of the first rotating body 41a conveyed from the rail 11d1 to the rail 11d2.

The number of second adsorbing devices 52 equal to the number of notches 41c disposed between the rail 11c1 and the rail 11c2 (rail 11d1 and rail 11d2) is set as one group. In the present embodiment, twelve second adsorbing devices 52 are set as one group, and two groups of these twelve second adsorbing devices 52 are provided. That is, twelve second adsorbing devices 52 are disposed between the rails 11c1 and 11c2 and between the rails 11d1 and 11d2, respectively.

When the first rotating body 41a is at a predetermined position, the placement portion 52a is disposed to face the notch 41c, and the molded product 111A held by the notch 41c is placed on the placement portion 52a. The upper surface of the placement portion 52a is formed in a planar shape and constitutes an adsorbing surface.

The ventilation path 52b is provided at a position facing the top plate portion 121 of the molded product 111A placed on the placement portion 52a. The ventilation path 52b is connected to the vacuum pump device 54.

The conveying device 53 fixes a plurality (twelve) of first adsorbing devices 51 in an arrangement opposed to a plurality (twelve) of second adsorbing devices 52 and moves the plurality of first absorbing devices 51a between the groups of second adsorbing devices 52. In addition, the conveying device 53 moves the plurality of first adsorbing devices 51 between a height position at which the vacuum pad 51b of the first adsorbing device 51 comes into contact with the sealing member 112 provided in the molded product 111A placed on the placement portion 52a and a height position at which the vacuum pad 51b spaced away from the molded product 111A placed on the placement portion 52a. That is, the conveying device 53 moves the plurality of first adsorbing devices 51 in the direction of gravity with respect to the molded product 111A placed on the placement portion 52a, and rotates the plurality of first adsorbing devices 51 by 180° about the rotation center of the first rotating body 41a.

The vacuum pump device 54 is connected to the ventilation paths 51d and 52b and sets the internal pressures of the ventilation paths 51d and 52b to negative pressure.

The molded product processing device 16 forms the knurl portion 131 on the molded product 111A and forms the tamper evidence band portion 133.

Figure 9:
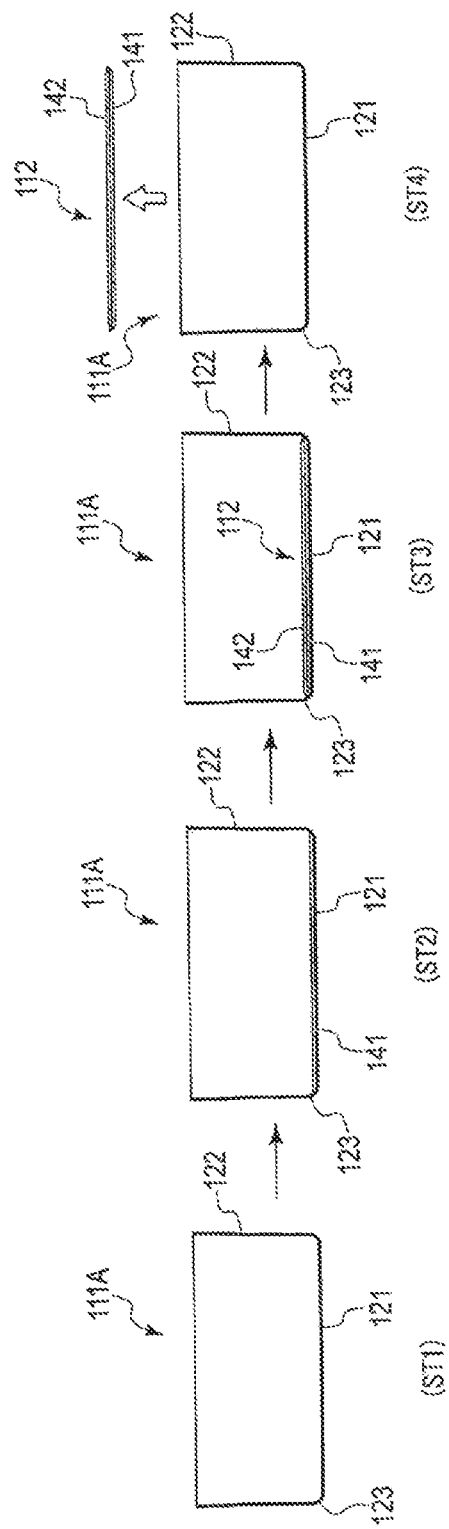
FIG. 9 is a flowchart schematically illustrating a part of a cap manufacturing process using the manufacturing apparatus of the cap.
Figure 11:
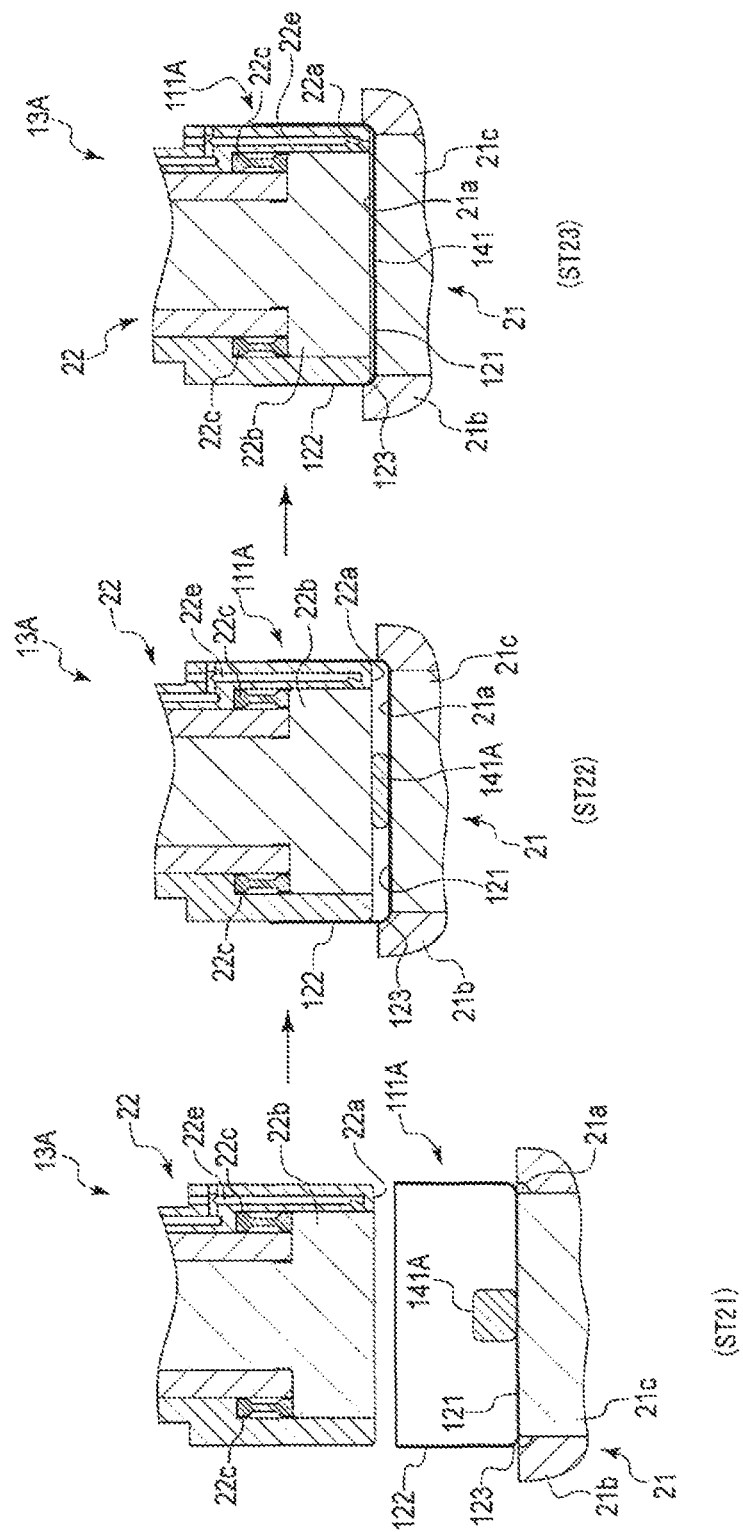
FIG. 11 is a flowchart schematically illustrating a cap manufacturing process in a part of a configuration of essential parts in the manufacturing apparatus of the cap.
Figure 12:
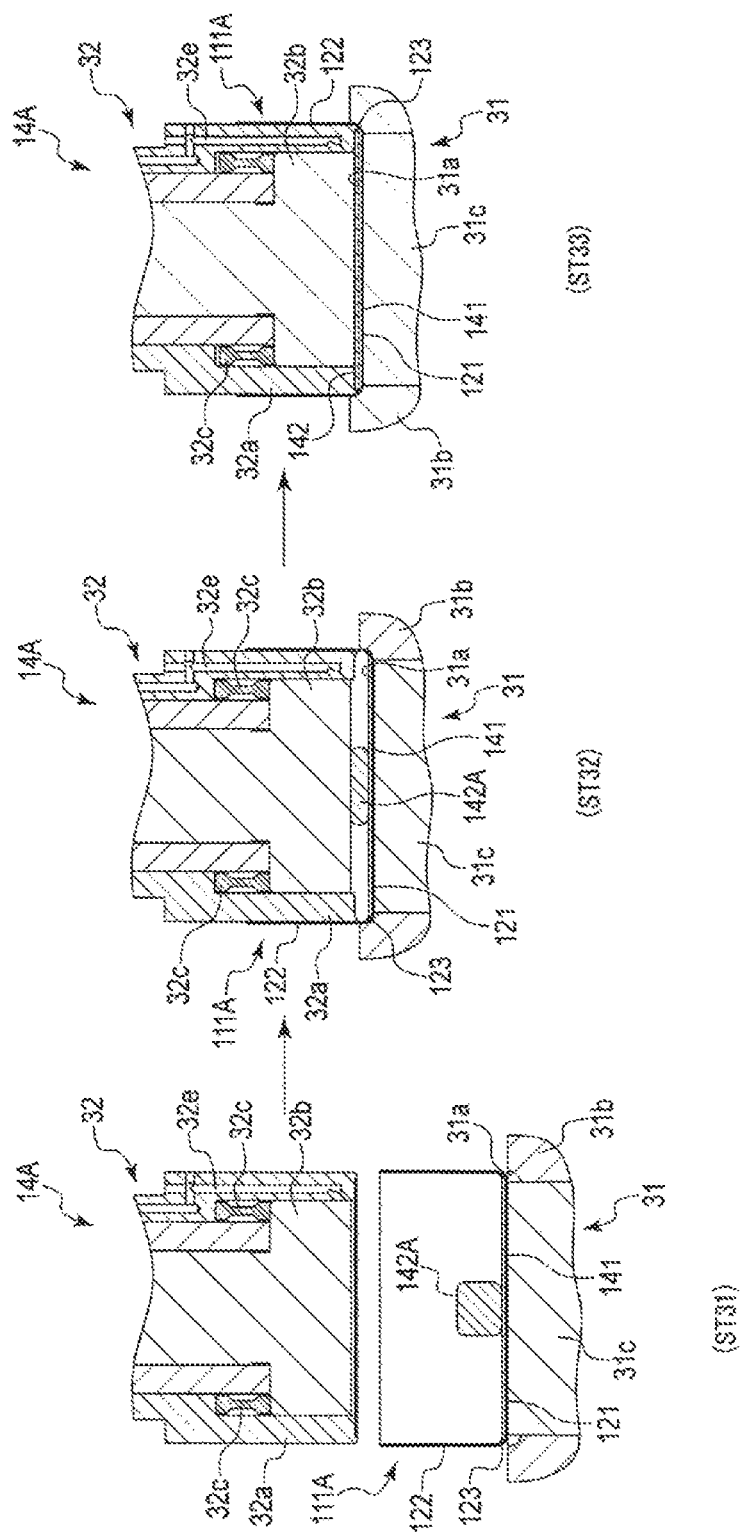
FIG. 12 is a flowchart schematically illustrating a cap manufacturing process in a part of a configuration of essential parts in the manufacturing apparatus of the cap.
Figure 13:
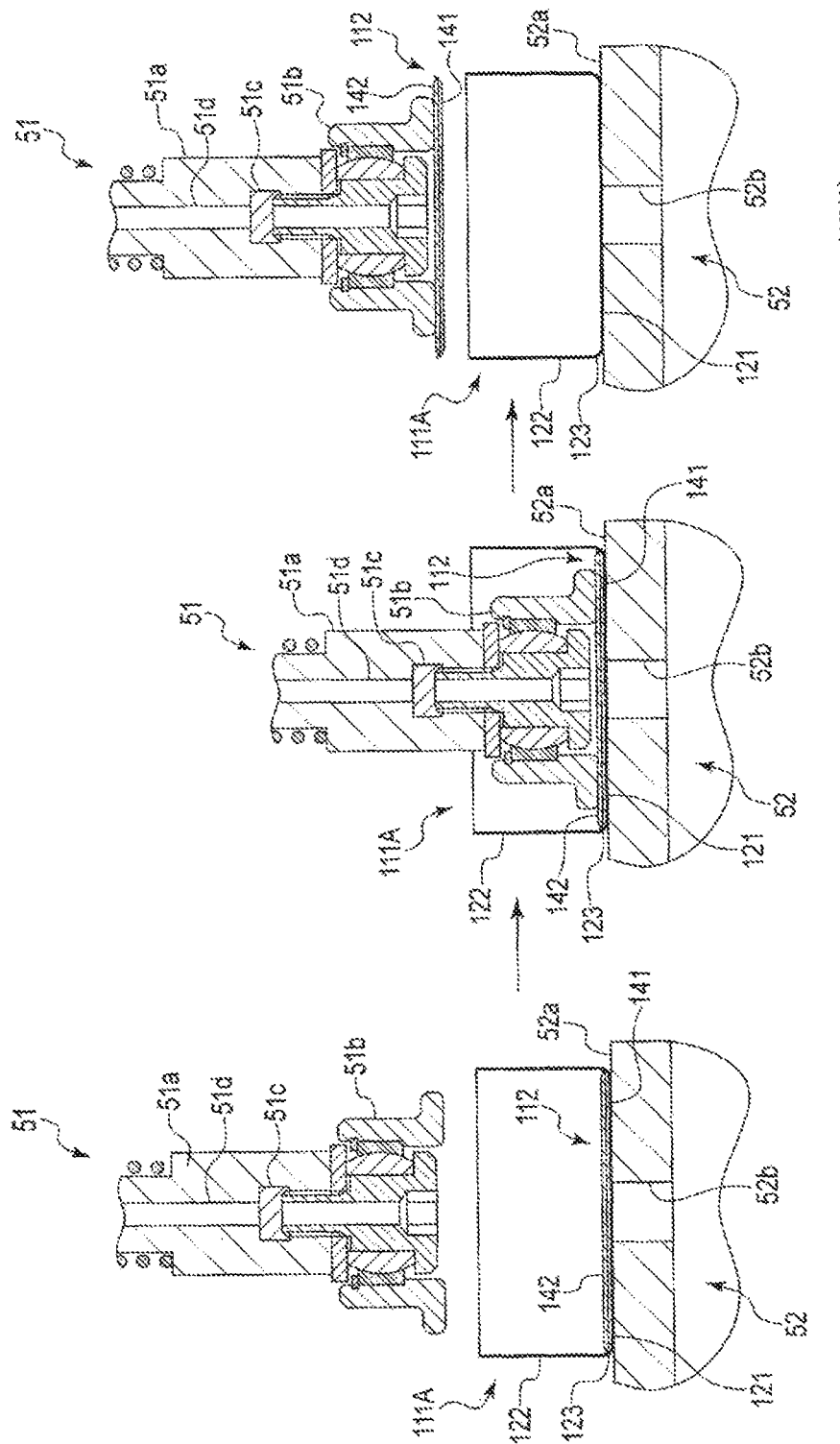
FIG. 13 is a flowchart schematically illustrating a cap manufacturing process in a part of a configuration of essential parts in the manufacturing apparatus of the cap.
Figure 14:
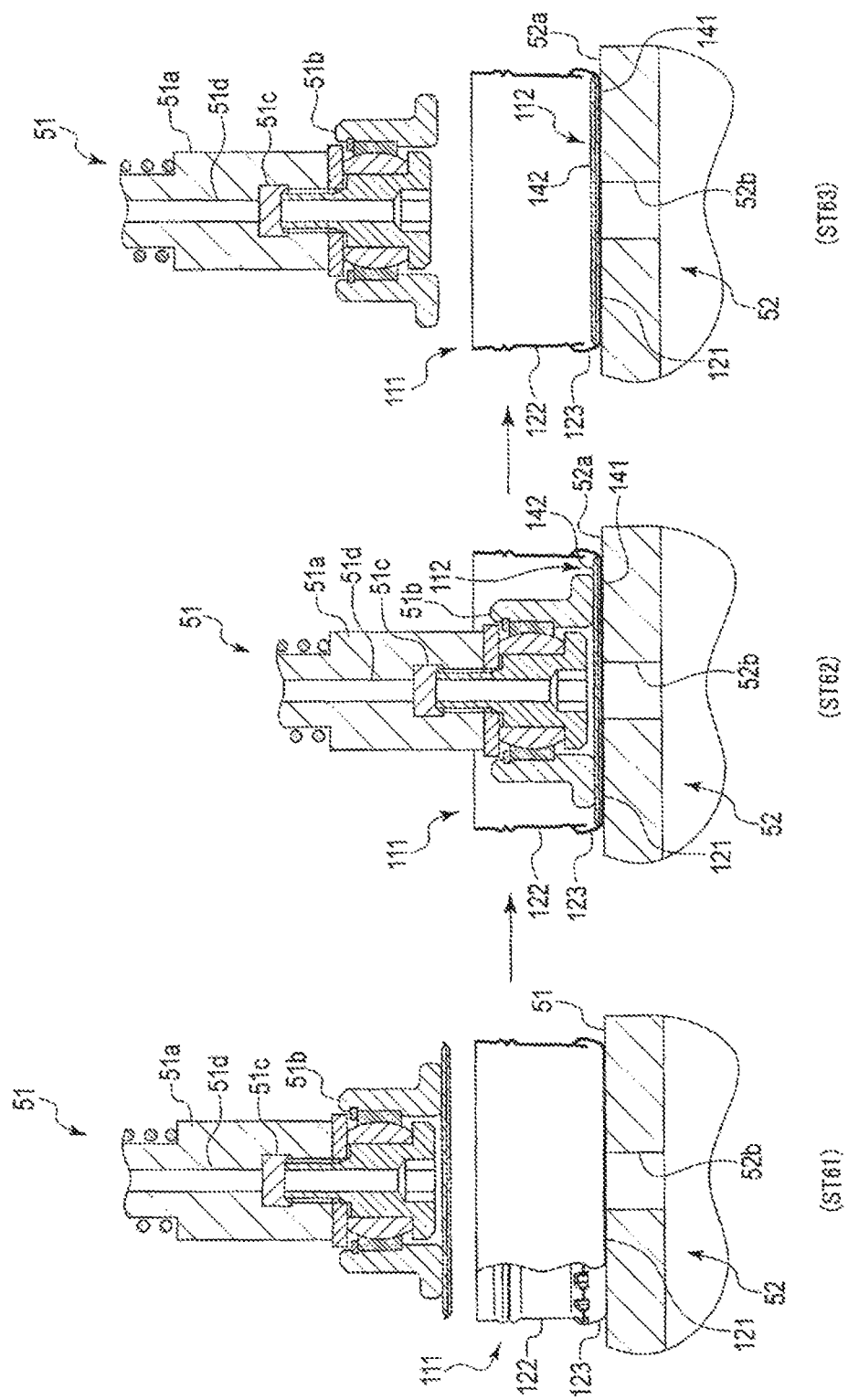
FIG. 14 is a flowchart schematically illustrating a cap manufacturing process in a part of a configuration of essential parts in the manufacturing apparatus of the cap.

Next, the manufacturing method of the cap 100 using the manufacturing apparatus 1 configured as described above will be described with reference to FIGS. 9 to 14. FIG. 9 is a flowchart schematically illustrating a part of the manufacturing process of the cap 100 using the manufacturing apparatus 1 of the cap 100. FIG. 10 is a flowchart schematically illustrating a part of the manufacturing process of the cap 100 using the manufacturing apparatus 1 of the cap 100. FIG. 11 is a flowchart schematically illustrating the manufacturing process of the cap 100 in a part of a configuration of essential parts in the manufacturing apparatus 1 of the cap 100. FIG. 12 is a flowchart schematically illustrating the manufacturing process of the cap 100 in a part of a configuration of essential parts in the manufacturing apparatus 1 of the cap 100. FIG. 13 is a flowchart schematically illustrating the manufacturing process of the cap 100 in a part of a configuration of essential parts in the manufacturing apparatus 1 of the cap 100. FIG. 14 is a flowchart schematically illustrating the manufacturing process of the cap 100 in a part of a configuration of essential parts in the manufacturing apparatus 1 of the cap 100.

First, the sheet-shaped metal material is drawed by the shell press device 12 to mold the molded product 111A (step ST1). Subsequently, the molded product 111A stored in the storage portion 12a is supplied from the supplying portion 12b to the conveying device 11, and the conveying device 11 conveys the molded product 111A to the sliding layer molding device 13. Next, the sliding layer 141 is molded on the top plate portion 121 of the molded product 111A by the sliding layer molding device 13 (step ST2).

As a specific example, first, the molded product 111A is arranged on the first lower mold 21 by the conveying mechanism 13B. At this time, the second movable mold 21c of the first lower mold 21 is lifted to a position at which the upper surface of the second movable mold 21c is flush with the upper surface of the first movable mold 21b. Next, the resin material (first resin material) for molding the sliding layer 141 is softened by the material supplying device 13C, and the resin ball 141A made into a predetermined amount of lump is arranged on the top plate portion 121 (step ST21). Note that the resin ball 141A may be arranged on the molded product 111A before placing the molded product 111A on the first lower mold 21.

Next, the first lower mold driving device 23 drives the first lower mold 21 to lift the first lower mold 21 (step ST22). At this time, the first upper mold 22 and the resin ball 141A comes into contact with each other, and the first upper mold 22 presses the resin ball 141A. In addition, due to the pressing force pressing the resin ball 141A of the first upper mold 22, the second movable mold 21c moves relatively to the first movable mold 21b up to the height position constituting the recess 21a against the urging force applied to the second movable mold 21c by the spring. Therefore, the molded product 111A is held in the recess 21a. Furthermore, the first lower mold 21 is left, and the first lower mold 21 moves to the height position at which the height from the upper surface of the top plate portion 121 to the tip end surface of the first upper mold 22 becomes equal to the thickness of the sliding layer 141, such that the sliding layer 141 is molded (step ST23).

Next, the first lower mold 21 is lowered to the position at which the first upper mold 22 is separated from the molded product 111A by the first lower mold driving device 23, and the first upper mold 22 is separated from the molded product 111A. At this time, the gas supplying device 24 is driven, gas is discharged from the gap between the first molding portion 22a and the second molding portion 22b through the flow passage 22e of the first molding portion 22a, whereby the release of the formed sliding layer 141 from the first upper mold 22 is promoted.

In addition, at this time, since the pressing of the first upper mold 22 against the second movable mold 21c is released, the second movable mold 21c is urged by the urging force of the spring, and the second movable mold 21c is lifted to the position at which the upper surface of the second movable mold 21c is flush with the upper surface of the first movable mold 21b. Therefore, the molded product 111A having the sliding layer 141 formed on the second rail 11b is conveyed by the conveying mechanism 13B.

Next, the molded product 111A is conveyed to the sealing layer molding device 14, and the sealing layer 142 is molded on the sliding layer 141 in the molded product 111A by the sealing layer molding device 14 (step ST3).

As a specific example, first, the molded product 111A is arranged on the second lower mold 31 by the conveying mechanism 14B. At this time, the second movable mold 31c of the second lower mold 31 is lifted to the position at which the upper surface of the second movable mold 31c is flush with the upper surface of the first movable mold 31b. Next, the resin material (second resin material) for molding the sealing layer 142 is softened by the material supplying device 14C, and the resin ball 142A made into a predetermined amount of lump is arranged on the top plate portion 121 (step ST31). Note that the resin ball 142A may be arranged on the molded product 111A before placing the molded product 111A on the second lower mold 31.

Next, the second lower mold driving device 33 drives the second lower mold 31 to lift the second lower mold 31 (step ST32). At this time, the second upper mold 32 and the resin ball 142A comes into contact with each other, and the second upper mold 32 presses the resin ball 142A. In addition, due to the pressing force pressing the resin ball 142A of the second upper mold 32, the second movable mold 31c moves relatively to the first movable mold 31b up to the height position constituting the recess 31a against the urging force applied to the second movable mold 31c by the spring. Therefore, the molded product 111A is held in the recess 31a. Furthermore, the second lower mold 31 is left, and the first lower mold 21 moves to the height position at which the height from the upper surface of the top plate portion 121 to the tip end surface of the second molding portion 32b of the second upper mold 32 becomes equal to the thickness of the sliding layer 141. At this time, the second molding portion 32b of the second upper mold 32 retreats to the inside of the first molding portion 32a from the position at which the tip end surface is flush with the tip end surface of the first molding portion 32a.

In addition, at this time, when the second lower mold 31 is lifted toward the tip end surface of the second molding portion 32b, the resin ball 142A on the sliding layer 141 of the molded product 111A lifted accordingly is compressed and deformed, and the protrusion portion 32d of the second upper mold 32 comes into contact with the deformed resin ball 142A. When the second lower mold 31A is further lifted, the first molding portion 32a urged by the spring is relatively lifted with respect to the second molding portion 32b against the urging force, and the tip end surface of the first molding portion 32a is flush with the tip end surface of the second molding portion 32b. Furthermore, the second lower mold 31 moves to the height position at which the height from the upper surface of the top plate portion 121 becomes equal to the thickness of the sealing member 112, and the sealing layer 142 is molded on the sliding layer 141 (step ST33).

Subsequently, when the second lower mold driving device 33 lowers the second lower mold 31, the first molding portion 32a of the second upper mold 32 urged by the spring is lowered accordingly and is in a state of protruding with respect to the second molding portion 32b. Accordingly, since the gas supplying device 34 supplies the gas to the flow passage 32e, gas exists between the second upper mold 32 and the sealing layer 142, and the sealing layer 142 is released from the second upper mold 32. Further, the second lower mold 31 is lowered by the second lower mold driving device 33, and the second lower mold 31 is lowered to the position at which the second upper mold 32 is separated from the molded product 111A. At this time, the pressing force applied to the second movable mold 31c by the second upper mold 32 is released, and the urging force of the spring lifts the second movable mold 31c to the position at which the upper surface of the second movable mold 31c is flush with the upper surface of the first movable mold 31b. Therefore, the molded product 111A having the sealing member 112 is conveyed to the third rail 11c by the conveying mechanism 14B.

Next, the molded product 111A is conveyed to the sealing member conveying device 15, and the sealing member 112 in the molded product 111A is taken out (step ST4).

As a specific example, first, the molded products 111A are sequentially supplied from the rail 11c1 of third rail 11c to the notch 41c of the first rotating body 41a by the supplying mechanism 42. The molded products 111A including the sealing member 112 are arranged in all the notches 41c, in the present embodiment, twelve notches 41c between the rail 11c1 and the rail 11c2 of the third rail 11c. Therefore, the twelve molded products 111A are placed on the placement portions 52a of the second adsorbing devices 52, respectively.

In this state, the conveying device 53 conveys the twelve first adsorbing devices 51 to the position at which the first adsorbing devices 51 face the molded products 111A (step ST41). Next, the twelve first adsorbing devices 51 are lowered by the conveying device 53 to the height position at which the vacuum pad 51b is in contact with the sealing member 112 provided in the molded product 111A placed on the placement portion 52a (step ST42). Next, the vacuum pump device 54 is driven to set the ventilation path 51d of the first adsorbing device 51 and the ventilation path 52b of the second adsorbing device 52 to negative pressure.

Next, the twelve first adsorbing devices 51 are lifted to the height position at which the vacuum pad 51b is separated from the molded product 111A placed on the placement portion 52a by the conveying device 53 (step ST43). Therefore, the sealing member 112 is taken out from the molded product 111A. Next, the first rotating body 41a rotates, the molded product 111A from which the sealing member 112 is taken out is sent out to the rail 11c2 of the third rail 11c, and the molded product 111A is supplied to the molded product processing device 16.

Note that, when the molded product 111A from which the sealing member 112 is taken out is sent out to the rail 11c2, the molded product 111A including the sealing member 112 is arranged in the notch 41c on the rail 11c1 side. As described above, the molded product 111A is sent and arranged until the molded product 111A including the sealing member 112 is arranged in all the notches 41c between the rails 11c1 and 11c2. Note that, when the molded product 111A including the sealing member 112 is disposed in all the notches 41c, the above-described steps ST41 to ST43 are performed from the arranged molded product 111A.

Next, the molded product 111A is conveyed to the molded product processing device 16, and the knurl portion 131 and the tamper evidence band portion 133 are molded on the molded product 111A by the molded product processing device 16 (step ST5). When the molded product 111A is processed by the molded product processing device 16, the molded product 111A is conveyed from the molded product processing device 16 to the fourth rail 11d.

Next, the molded product 111A is conveyed to the sealing member conveying device 15, and the sealing member 112 is inserted into the molded product 111A (step ST6).

As a specific example, first, the molded products 111A are sequentially supplied from the rail 11d1 of fourth rail 11d to the notch 41c of the first rotating body 41a by the supplying mechanism 42. The processed molded products 111A are arranged in all the notches 41c, in the present embodiment, twelve notches 41c between the rail 11d1 and the rail 11d2 of the fourth rail 11d. Therefore, the twelve molded products 111A are placed on the placement portions 52a of the second adsorbing devices 52, respectively.

In this state, the twelve first adsorbing devices 51, to which the sealing member 112 is adsorbed, are conveyed to the position facing the molded product 111A by the conveying device 53 (step ST61). Here, the sealing member 112 adsorbed to the first adsorbing device 51 is a sealing member 112 which is taken out from the molded product 111A in which the knurl portion 131 and the tamper evidence band portion 133 are not processed and which is disposed in the notch 41c at the position rotated by 180°. That is, steps ST4 and ST6 are simultaneously performed in the sealing member conveying device 15.

Next, the twelve first adsorbing devices 51 are lowered by the conveying device 53 to the height position at which the sealing member 112 adsorbed on the vacuum pad 51b comes into contact with the top plate portion 121 of the molded product 111A placed on the placement portion 52a (step ST62). Subsequently, the vacuum pump device 54 is driven to raise the pressure of the ventilation path 51d of the first adsorbing device 51 from the negative pressure to the atmospheric pressure.

Next, the twelve first adsorbing devices 51 are lifted by the conveying device 53 to the height position at which the vacuum pad 51b is separated from the molded product 111A placed on the placement portion 52a (step ST63). Therefore, the sealing member 112 is inserted into the molded product 111A, and the sealing member 112 is disposed on the top plate portion 121 of the molded product 111A.

Through these steps, the cap 100 is manufactured (step ST7). Next, the first rotating body 41a rotates, the cap 100 is sent out to the rail 11d2 of the fourth rail 11d, and the cap 100 is collected in the collecting portion 17. When a certain number of caps 100 are collected in the collecting portion 17, the caps 100 are conveyed to a next process, that is, an inspecting and packaging process.

In the manufacturing apparatus 1 configured as described above, the sealing member conveying device 15 takes out the sealing member 112 from the molded product 111A in which the knurl portion 131 and the tamper evidence band portion 133 are to be molded by the molded product processing device 16, and then, the molded product 111A is processed by the molded product processing device 16. Therefore, when the knurl portion 131 and the tamper evidence band portion 133 are molded by the molded product processing device 16, it is possible to prevent contamination from occurring on the sealing member 112 by the contact with the mold. Even if metallic powder is generated at the time of slit molding of the vent slit 131a or the tamper evidence band portion 133, it is possible to prevent contamination or metal powder from being bonded to the sealing member 112.

In addition, in the manufacturing apparatus 1, in the sealing member conveying device 15, the sealing member 112 is taken out from the molded product 111A before being processed by the molded product processing device 16, and the taken-out sealing member 112 is arranged at the same timing on the molded product 111A processed by the molded product processing device 16 held by the first rotating body 41a. Therefore, the taken-out sealing member 112 is disposed on another molded product 111A different from the molded product 111A from which the sealing member 112 is taken out. In other words, the sealing member 112 is assembled into another molded product 111A which is different from the molded product 111A in which the sealing member 112 is molded inside and which is subjected to a predetermined molding process before the molded product 111A. Therefore, it is possible to shorten the number of processes and the time because it is not necessary to temporarily store the taken-out sealing member 112 or to adsorb the sealing member 112 again. Therefore, the manufacturing apparatus 1 has high productivity even when the sealing member 112 is taken in and out.

In addition, the manufacturing apparatus 1 was configured to lift and lower the second movable molds 21c and 31c of the first lower mold 21 and the second lower mold 31, such that it is flush with the first movable molds 21b and 31b at the time of lifting and forms the recesses 21a and 31a in which the molded products 111A are arranged at the time of lowering. With this configuration, when the sliding layer 141 and the sealing layer 142 are formed by the sliding layer molding device 13 and the sealing layer molding device 14, the manufacturing apparatus 1 can hold the molded products 111A in the recesses 21a and 31a. As a result, when the sliding layer 141 and the sealing layer 142 are formed in the molded product 111A, it is possible to prevent deformation of the corner portion 123 of the molded product 111A by the pressure of the resin material pressed and expanded by the upper molds 22 and 32.

In addition, with this configuration, in the manufacturing apparatus 1, when the molded product 111A is moved with respect to the first lower mold 21 and the second lower mold 31, since the upper surfaces of the first movable molds 21b and 31b and the upper surfaces of the second movable molds 21c and 31c are flush with each other, the molded product 111A can be conveyed on the same plane when conveying the molded product 111A, thereby facilitating the conveying to the lower molds 21 and 31 and the conveying from the lower molds 21 and 31.

Furthermore, the manufacturing apparatus 1 was configured to reciprocate the first molding portion 32a in one direction with respect to the second molding portion 32b between the tip end surface of the second molding portion 32b and the position at which the first molding portion 32a protrudes by about 0.1 mm to 2 mm from the tip end surface of the second molding portion 32b, such that the first molding portion 32a of the second upper mold 32 protrudes to the outside of the second molding portion 32b. Further, in the manufacturing apparatus 1, the second upper mold 32 was configured to supply air from the gap between the first molding portion 32a and the second molding portion 32b to the tip end surface of the second upper mold 32. With this configuration, when the sealing member 112 is released from the second upper mold 32 after molding the sealing layer 142, the first molding portion 32a is moved so as to protrude from the tip end surface of the second molding portion 32b, and the sealing member 112 can be easily released from the second upper mold 32 by injecting air through the gap between the first molding portion 32a and the second molding portion 32b. The manufacturing apparatus 1 can obtain high productivity. This is because the sealing member 112 is not bonded to the top plate portion 121 and the sealing member 112 can be easily released from the second upper mold 32 although the sealing member 112 is formed of an elastomer resin material or the like used to obtain a sealing function and difficult to release from the second upper mold 32.

As described above, the manufacturing apparatus 1 according to the embodiment of the present invention can improve productivity.

Note that the present invention is not limited to the above embodiment. For example, in the above-described example, the configuration in which the lower molds 21 and 31 are driven as the movable type at the time of molding the sliding layer 141 and the sealing layer 142 has been described, but the present invention is not limited thereto. For example, the lower molds 21 and 31 may be the fixed type, and the upper molds 22 and 32 may be the movable type which moves with respect to the lower molds 21 and 31. In addition, the configuration in which the second movable mold 21c of the first lower mold 21, the second movable mold 31c of the second lower mold 31, and the second molding portion 32b of the second upper mold 32 are urged toward the molded product 111A formed by the spring such as the biasing member has been described, but the present invention is not limited thereto. For example, the biasing member may be another elastic body which urges the second movable mold 21c, the second movable mold 31c, and the second molding portion 32b in one direction. In addition, the biasing member is a driving device which mechanically reciprocates the second movable mold 21c, the second movable mold 31c, and the second molding portion 32b in one direction, and in the molding process, the second movable mold 21c, the second movable mold 31c, and the second molding portion 32b may be reciprocated as appropriate.

That is, the present invention is not limited to the embodiments, and various modifications can be made in the implementation stage without departing from the gist thereof. In addition, the respective embodiments may be combined as appropriate, and in that case, the combined effect can be obtained. Furthermore, the above embodiments include various inventions, and various inventions can be extracted by a combination selected from a plurality of disclosed constitutional requirements. For example, even if some constituent requirements are deleted from all the constituent requirements shown in the embodiment, if the problem can be solved and the effect is obtained, the configuration in which the constituent requirements are deleted can be extracted as the invention.

What is claimed is:

1. A manufacturing method of a cap, comprising:
   supplying a first resin material to a molded product having a top plate portion and a skirt portion integrally formed on the top plate portion through a curved corner portion having an annular shape;
   molding the first resin material of the molded product disposed in a first lower mold into a sliding layer having a predetermined shape with a first upper mold;
   supplying a second resin material to the sliding layer;
   molding the second resin material of the molded product disposed in a second lower mold into a sealing layer having a predetermined shape with a second upper mold;
   taking out a sealing member including the sliding layer and the sealing layer in the molded product;
   performing a predetermined molding on the molded product; and
   inserting the sealing member into another molded product different from the molded product on which the predetermined molding is performed.

2. The manufacturing method according to claim 1, wherein the first lower mold and the second lower mold each include a cylindrical fixed mold and a columnar movable mold which is disposed in an opening of a center of the fixed mold and constitutes a recess having a shape of the top plate portion and the corner portion of the molded product together with an upper surface of the fixed mold on the upper surface,
   the movable mold reciprocates between a position constituting the recess and a position which is flush with the upper surface of the movable mold and the upper surface of the fixed mold,
   the upper surface of the fixed mold and the upper surface of the movable mold are flush when the molded product is placed on the first lower mold and the second lower mold, and
   when the first resin material is molded with the first upper mold and when the second resin material is molded with the second upper mold, the fixed mold and the movable mold constitute the recess.

3. The manufacturing method according to claim 1, wherein the second upper mold includes a cylindrical first molding portion and a columnar second molding portion provided at a center of the first molding portion,
   the first molding portion is movable with respect to the second molding portion, and
   after molding the sealing layer, the first molding portion protrudes from the second molding portion, and gas is ejected from a gap between the first molding portion and the second molding portion.

* * * * *